United States Patent
Kim et al.

(10) Patent No.: US 8,179,665 B2
(45) Date of Patent: May 15, 2012

(54) SOLID ELECTROLYTIC CAPACITOR WITH INCREASED CAPACITANCE

(75) Inventors: Jae Kwang Kim, Gyeonggi-do (KR); Kwan Hyeong Kim, Gyeonggi-do (KR); Chong Hoon Pak, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 449 days.

(21) Appl. No.: 12/371,335

(22) Filed: Feb. 13, 2009

(65) Prior Publication Data

US 2010/0142125 A1    Jun. 10, 2010

(30) Foreign Application Priority Data

Dec. 8, 2008   (KR) .................. 10-2008-0123993

(51) Int. Cl.
*H01G 4/228*   (2006.01)
*H01G 9/10*    (2006.01)
*H01G 9/04*    (2006.01)
*H05K 5/03*    (2006.01)

(52) U.S. Cl. ............... 361/538; 361/533; 361/540
(58) Field of Classification Search ............... 361/540, 361/533, 538, 523
See application file for complete search history.

(56) References Cited

U.S. PATENT DOCUMENTS

| | | | |
|---|---|---|---|
| 6,421,227 B2 * | 7/2002 | Nitoh et al. | 361/523 |
| 6,808,541 B2 * | 10/2004 | Maeda | 29/25.03 |
| 7,133,276 B2 * | 11/2006 | Fujii et al. | 361/523 |
| 7,352,561 B2 * | 4/2008 | Nakamura | 361/523 |
| 2007/0279841 A1 * | 12/2007 | Kim et al. | 361/540 |
| 2008/0232039 A1 * | 9/2008 | Saito et al. | 361/534 |

FOREIGN PATENT DOCUMENTS

| | | | |
|---|---|---|---|
| JP | 2001126958 | | 5/2001 |
| JP | 2002110458 | | 4/2002 |
| JP | 2003234251 A | * | 8/2003 |
| KR | 10-2008-0007874 A | | 1/2008 |

OTHER PUBLICATIONS

Chinese Office Action for Application No. 200910127127.9 mailed Apr. 21, 2011.

* cited by examiner

*Primary Examiner* — Eric Thomas
*Assistant Examiner* — David M Sinclair
(74) *Attorney, Agent, or Firm* — Lowe, Hauptman, Ham & Berner, LLP

(57) ABSTRACT

A solid electrolytic capacitor includes a capacitor element surrounded with a cathode layer, an anode wire inserted into the capacitor element, a cathode terminal electrically connected to the capacitor element by being positioned at one side below the capacitor element, an anode terminal defining a space between the capacitor element and a top surface thereof and is electrically connected to the anode wire by being positioned at the other side below the capacitor element, a conductive paste coated being thicker toward an inside of the capacitor element, thereby electrically connecting the capacitor element to the cathode terminal and broadening the space, and a fixing film closely coupled to a bottom surface of the conductive paste. A molding unit wraps the capacitor element and the fixing film in a state of closely adhering the conductive paste and the cathode terminal to top and bottom surfaces of the fixing film, respectively.

13 Claims, 2 Drawing Sheets

[FIG. 1]
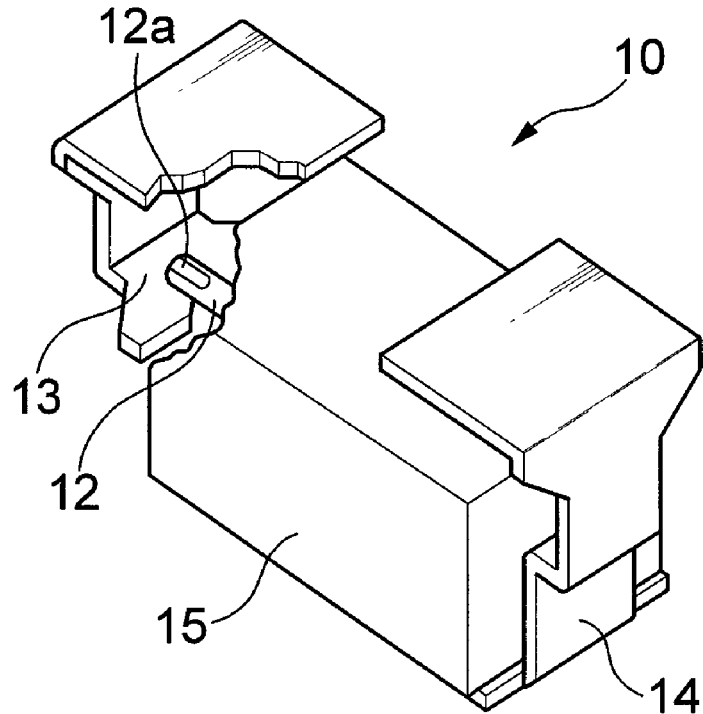
- PRIOR ART -
[FIG. 2]
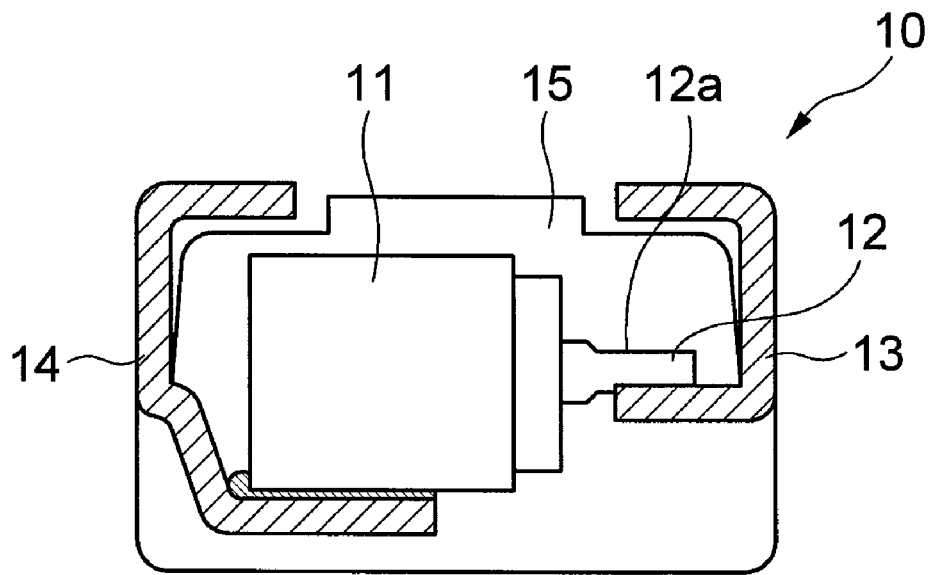
- PRIOR ART -

[FIG. 3]
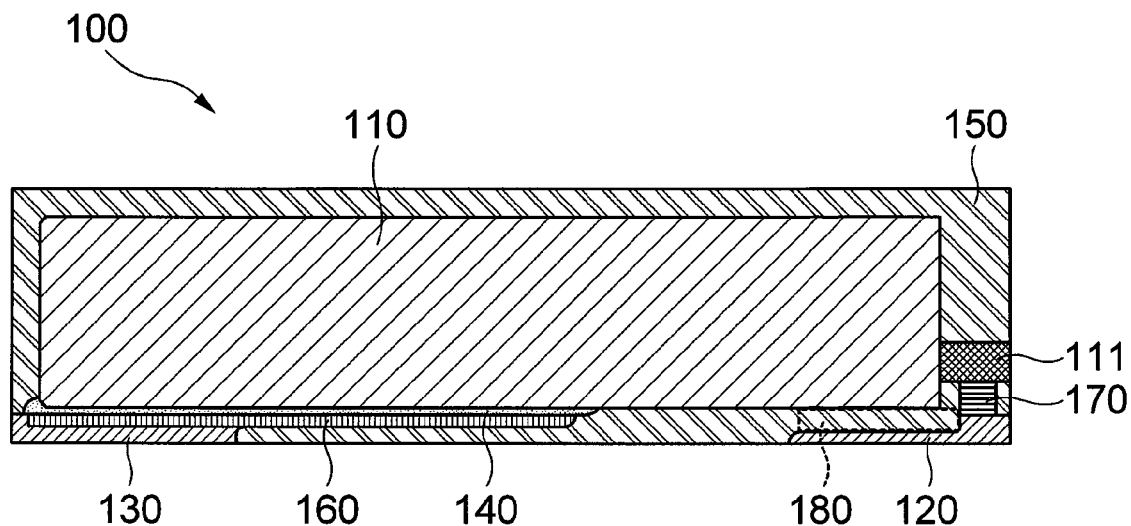
[FIG. 4]
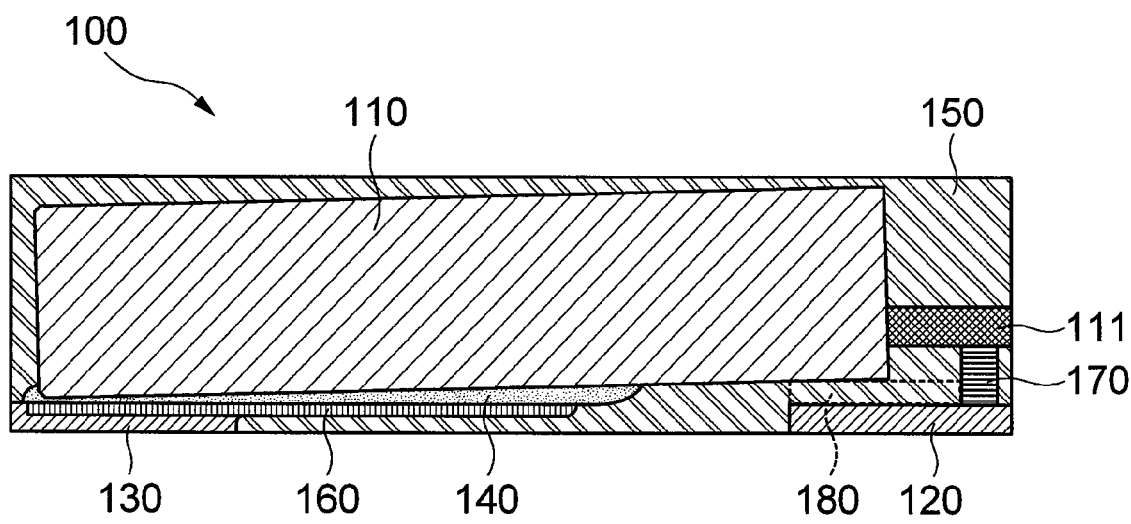

SOLID ELECTROLYTIC CAPACITOR WITH INCREASED CAPACITANCE

CROSS-REFERENCE TO RELATED APPLICATIONS

This application claims the benefit of Korean Patent Application No. 10-2008-0123993 filed with the Korea Intellectual Property Office on Dec. 8, 2008, the disclosure of which is incorporated herein by reference.

BACKGROUND OF THE INVENTION

1. Field of the Invention

The present invention relates to a solid electrolytic capacitor; and, more particularly, to a solid electrolytic capacitor capable of improving capacitance by maximizing volumetric efficiency of a capacitor element while pursuing manufacture of a miniaturized capacitor by injecting molding material on the anode terminal positioned at one side of a bottom surface of a molding unit to insulate the capacitor element from an anode terminal.

2. Description of the Related Art

Generally, a solid electrolytic capacitor is one of electronic parts used to interrupt DC and pass AC as well as to store electricity. As a representative solid electrolytic capacitor, a tantalum capacitor has been manufactured.

The tantalum capacitor is used for an application circuit low in a usage range of a rated voltage as well as for a general industrial device and particularly, it is frequently used to reduce noise of a circuit or a portable communication device with a poor frequency characteristic.

Such a capacitor is fundamentally manufactured by inserting a lead wire into a central portion of a tantalum element or a position except for the central portion or bending the inserted lead wire outside the tantalum element.

Further, as a method for assembling a lead frame to the tantalum element, there is used a method in which an anode terminal is drawn out through spot welding of an anode (+) lead wire and an anode (+) lead frame and an electrode terminal is drawn out through anode and cathode lead forming after mold-packaging.

FIGS. 1 and 2 are views showing a conventional solid electrolytic capacitor, wherein FIG. 1 is a perspective view showing the conventional solid electrolytic capacitor and FIG. 2 is a cross-sectional view showing the conventional solid electrolytic capacitor.

As shown in the drawings, the conventional solid electrolytic capacitor 10 includes a capacitor element 11 made of dielectric powder to determine capacity and characteristic of the capacitor, anode and cathode lead frames 13 and 14 connected to the capacitor element 11 to be easily mounted to a PCB (Printed Circuit Board), and an epoxy case 15 molded with epoxy to protect the capacitor element 11 against an external environment and form a shape of the capacitor element 11.

At this time, the capacitor element 11 includes a rod-shaped anode wire 12 which protrudes at one side at a predetermined length.

And, the anode wire 12 includes a pressure surface 12a with a flat external surface in order to increase a contact ratio with the anode lead frame 13 and prevent right and left shaking in welding.

Herein, a method for manufacturing the capacitor element 11 includes the steps of: sintering dielectric powder after forming it in a rectangular parallelepiped shape in a press process, forming a dielectric oxide film on the external surface through a formation process, and impregnating it into an aqueous solution of manganese nitrate in order to form a manganese dioxide layer made of solid electrolyte on an external surface through pyrolysis.

A process for connecting the anode and cathode lead frames 13 and 14 to the thus-manufactured capacitor element 11 includes the steps of: drawing out the anode terminal by welding the plate-shaped anode lead frame 13 on the pressure surface 12a of the rod-shaped anode wire 12 protruding at the one side of the capacitor element 11 at the predetermined length and drawing out the cathode terminal through the medium of a conductive adhesive coated on an external surface of the capacitor element 11 or the cathode lead frame 14.

And, the manufacture of the capacitor is completed through a final marking process after forming the epoxy case 15 by molding the capacitor element 11 electrically connected to the anode and cathode lead frames 13 and 14 with the epoxy in a cladding process.

The thus-manufactured conventional solid electrolytic capacitor 10 has problems in that capacitance is reduced and impedance is increasing as efficiency of volume occupied by the capacitor element 11 of the entire volume including the epoxy case 15 is dramatically deteriorated.

SUMMARY OF THE INVENTION

The present invention has been proposed in order to overcome the above-described problems and it is, therefore, an object of the present invention to provide a solid electrolytic capacitor capable of maximizing volumetric efficiency of a capacitor element by insulating the capacitor element from an anode terminal through a molding injection space formed on the anode terminal.

In accordance with one aspect of the present invention to achieve the object, there is provided a solid electrolytic capacitor including a capacitor element with positive polarity therein, wherein an external surface of the capacitor element is surrounded with a cathode layer, an anode wire inserted into one end of the capacitor element, a cathode terminal electrically connected to the capacitor element by being positioned at one side of a lower part of the capacitor element, an anode terminal which defines a molding injection space on a top surface thereof and is electrically connected to the anode wire by being positioned at the other side of the lower part of the capacitor element, a conductive paste coated on the capacitor element and being thicker toward an inside of the capacitor element, thereby electrically connecting the capacitor element to the cathode terminal, and broadening a space between the capacitor element and the anode terminal, a molding unit which wraps an external surface of the cathode layer and is formed to expose bottom surfaces of the anode terminal and the cathode terminal, and a fixing film made of conductive epoxy which is closely coupled to a bottom surface of the conductive paste. The molding unit is formed to wrap the capacitor element and the fixing film in a state of closely adhering the conductive paste and the cathode terminal to top and bottom surfaces of the fixing film, respectively.

The anode wire of which one end is exposed outside the capacitor element by coupling the other end to the capacitor element is electrically bonded to reinforcing material electrically connected to the anode terminal.

The anode wire and the reinforcing material can be bonded through laser welding.

When the molding unit is molded while wrapping an outer circumferential surface of the capacitor element through molding material such as epoxy, the molding material is injected into the molding injection space of an upper part of the anode terminal in order to insulate the capacitor element from the anode terminal.

The capacitor element includes the cathode layer and a cathode reinforcing layer at the outer circumferential surface, the cathode layer is formed with an insulation layer made of an oxide film of tantalum oxide and a solid electrolytic layer made of manganese dioxide ($MnO_2$) on the surface of the capacitor element, and the cathode reinforcing layer is further formed by sequentially coating carbon and silver(Ag) paste on an outer circumferential surface of the cathode layer.

Further, the capacitor element is electrically connected to the cathode terminal through conductive paste and the conductive paste is mainly made of silver(Ag) paste.

Meanwhile, in accordance with another aspect of the present invention to achieve the object, there is provided a solid electrolytic capacitor including a capacitor element with positive polarity therein, wherein an external surface of the capacitor element is surrounded with a cathode layer, an anode wire inserted into one end of the capacitor element, an anode terminal electrically connected to the anode wire through reinforcing material by being positioned at one side of a lower part of the capacitor element, a cathode terminal positioned at the other side of the lower part of the capacitor element and electrically connected to the capacitor element through conductive paste, the conductive paste being coated thicker as the conductive paste approaches an inside of the capacitor element, thereby broadening a space between the capacitor element and the anode terminal, a molding unit which wraps an external surface of the cathode layer and is formed to expose bottom surfaces of the anode terminal and the cathode terminal, and a fixing film closely coupled to a bottom surface of the conductive paste. The molding unit is formed to wrap the capacitor element and the fixing film in a state of closely adhering the conductive paste and the cathode terminal to top and bottom surfaces of the fixing film, respectively.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view showing a conventional solid electrolytic capacitor;

FIG. 2 is a cross-sectional view showing the conventional solid electrolytic capacitor;

FIG. 3 is a cross-sectional view illustrating a solid electrolytic capacitor in accordance with an embodiment of the present invention; and FIG. 4 is a cross-sectional view illustrating a solid electrolytic capacitor in accordance with another embodiment of the present invention.

DETAILED DESCRIPTION OF THE PREFERABLE EMBODIMENTS

A matter regarding to an operation effect including a technical configuration for an object of a solid electrolytic capacitor in accordance with the present invention will be appreciated clearly through the following detailed description with reference to the accompanying drawings illustrating preferable embodiments of the present invention.

At first, FIG. 3 is a cross-sectional view illustrating a solid electrolytic capacitor in accordance with an embodiment of the present invention.

As shown in the drawing, the solid electrolytic capacitor 100 in accordance with the embodiment of the present invention includes a capacitor element 110 coupled with an anode wire 111 at one end surface, a molding unit 150 wrapping the capacitor element 110, and an anode terminal 120 and a cathode terminal 130 formed at both sides of a lower part of the molding unit 150 to expose bottom surfaces thereof.

The capacitor element 110 is formed in a rectangular parallelepiped shape coupled with the anode wire 111 to expose one end of the anode wire 111 and a cathode layer (not shown in the drawing) is formed on an external surface of a tantalum pellet having positive polarity.

At this time, the capacitor element 110 is formed by a dielectric element with a dielectric oxide film ($Ta_2O_5$) layer on the external surface of the tantalum pellet manufactured by mixing tantalum powder and a binder, pressing them in a rectangular parallelepiped shape, and sintering it under high-temperature and high-vibration conditions.

The capacitor element 110 can be manufactured by sintering material such as niobium(Nb) oxide in addition to tantalum(Ta).

The cathode layer formed on the external surface of the capacitor element 110 converts the tantalum pellet having the positive polarity into a cathode, wherein the cathode layer of a manganese dioxide($MnO_2$) layer having negative polarity is formed by impregnating the tantalum pellet formed with the dielectric oxide film layer as an insulation layer into a manganese nitrate solution to coat the external surface thereof with the manganese nitrate solution and sintering it.

And, a cathode reinforcing layer can be further provided by sequentially applying carbon and silver paste outside the cathode layer, wherein the cathode reinforcing layer can facilitate electrical connection for polar transmission with the cathode terminal 130 in contact with the cathode layer by improving conductivity for polarity of the cathode layer.

Herein, illustration and reference numerals of the cathode layer and the cathode reinforcing layer are omitted in the drawing because the above components are regarded as the well-known techniques which can be sufficiently appreciated by those skilled in the art without the illustration in the drawing in manufacturing the capacitor element of the solid electrolytic capacitor in accordance with the present invention.

Meanwhile, the cathode terminal 130 is closely coupled to a bottom surface of the capacitor element 110, wherein the cathode terminal 130 is electrically connected to the capacitor element 110 through conductive paste 140 such as silver(Ag) paste.

The conductive paste 140 can be made of the conductive paste having viscosity such as Au, Pd, Ag, Ni and Cu in addition to Ag and is coated at a portion of the bottom surface of the capacitor element 110 to have sufficient hardness and adhesion strength through processes such as drying, curing and firing.

At this time, the conductive paste 140 can be cured at a temperature in the range of approximately 30~300° C.

Further, a fixing member 160 made of conductive material is interposed between the capacitor element 110 and the cathode terminal 130. The fixing member 160 reinforces adhesive force of the cathode terminal 130 to the bottom surface of the capacitor element 110 coated with the conductive paste 140 by being formed in a film type and can be formed in the substantially same area as the conductive paste 140.

The fixing member 160 is mainly made of conductive epoxy with high chemical and mechanical affinity and in addition, it can be made of steel or paste material.

Further, the anode terminal 120 applied to the solid electrolytic capacitor 100 of the present embodiment is electrically connected to the anode wire 111 coupled to the capacitor element 110 so that the one end thereof protrudes.

The anode terminal 120 and the anode wire 111 are connected through a reinforcing material 170 vertically coupled on the anode terminal 120 and a protruding end of the anode wire 111 is in contact with a front end of the reinforcing material 170 to be bonded through welding, particularly laser welding.

At this time, a concave groove (not shown in the drawing) can be formed at the front end of the reinforcing material 170 bonded to the protruding end of the anode wire 111 in order to easily contact the anode wire 111 with the reinforcing material 170.

The anode terminal 120 has a molding injection space 180 inside a portion where the reinforcing material 170 is vertically coupled, i.e., a step portion inside the capacitor element 110 through etching or pressing.

The molding injection space 180 can prevent short due to contact between the capacitor element 110 of which the external surface has the negative polarity and the anode terminal 120 by forming a separation space between the bottom surface of the capacitor element 110 and a top surface of the anode terminal 120 and injecting the molding material wrapping an exterior of the capacitor element 110 into the separation space.

In other words, since the short between the capacitor element 110 and the anode terminal 120 can be prevented through the molding injection space 180, a coupling lateral end of the anode wire 111 of the capacitor element 110 is extended by being expanded to an upper spot of the anode terminal 120 except for a minimum region for coupling the anode wire 111 and the reinforcing material 170, thereby increasing volumetric efficiency of the capacitor element 110.

Therefore, it is possible to manufacture the capacitor with the improved capacitance of more than approximately 20% in comparison with the above-mentioned conventional solid electrolytic capacitor.

When the anode terminal 120 and the cathode terminal 130 are coupled to the bottom surface of the capacitor element 110 respectively, the molding unit 150 wrapping an outer circumferential surface of the capacitor element 110 is formed to expose the bottom surfaces of the anode terminal 120 and the cathode terminal 130.

The molding unit 150 protects the capacitor element 110 against an external environment by wrapping the outer circumferential surface of the capacitor element 110 and portions other than the anode wire 111 coupled to the capacitor element 110 and the bottom surfaces of the anode terminal 120 and the cathode terminal 130 exposed outward and is mainly made of epoxy material.

When forming the molding unit 150 on the circumferential surface of the capacitor element 110, the molding unit 150 can be formed by using the epoxy by a unit capacitor element 110 and the molding unit 150 can be collectively formed after arranging the capacitor elements 110 at equal intervals.

Next, FIG. 4 is a cross-sectional view illustrating a solid electrolytic capacitor in accordance with another embodiment of the present invention.

As shown in the drawing, like the above-described embodiment, the solid electrolytic capacitor in accordance with the present embodiment includes a capacitor element 110 coupled with an anode wire 111 at one end surface, a molding unit 150 wrapping the capacitor element 110, and an anode terminal 120 and a cathode terminal 130 formed at both sides of a lower part of the molding unit 150 to expose bottom surfaces thereof.

At this time, when a conductive paste 140 is interposed between the capacitor element 110 and the cathode terminal 130 in order to electrically connect them, the conductive paste 140 is coated thicker as approaching an inside of the capacitor element 110 from an outside thereof.

Namely, as a coupling end side of the anode wire 111 of the capacitor element 110 is inclined to face upward through control of the coating thickness of the conductive paste 140, a molding injection space 180 is formed between the capacitor element 110 and the anode terminal 120.

Therefore, like the solid electrolytic capacitor of the above-mentioned embodiment, the solid electrolytic capacitor of the present embodiment can prevent short due to contact between the capacitor element 110 of which the external surface has negative polarity and the anode terminal 120 by forming a separation space between the bottom surface of the capacitor element 110 and a top surface of the anode terminal 120 and injecting molding material wrapping an exterior of the capacitor element 110 into the separation space.

In other words, since the short between the capacitor element 110 and the anode terminal 120 can be prevented through the molding injection space 180, a coupling lateral end of the anode wire 111 of the capacitor element 110 is extended by being expanded to an upper spot of the anode terminal 120 except for a minimum region for coupling the anode wire 111 and the reinforcing material 170, thereby increasing volumetric efficiency and capacitance of the capacitor element 110 like the above mentioned embodiment.

Herein, since a technical configuration of the solid electrolytic capacitor of the present embodiment is the same as that of the solid electrolytic capacitor of the above-mentioned embodiment except for a configuration of the conductive paste 140 coated on the bottom surface of the capacitor element 110, detailed description of overlapping technical configuration is omitted.

As described above, the solid electrolytic capacitor in accordance with the present invention can maximize the volumetric efficiency by forming the molding injection space for electrical insulation between the anode terminal and the bottom surface of the capacitor element to increase the volume of the capacitor element up to the upper sport of the anode terminal and can obtain operation effect of improving the capacitance while minimizing the size of the capacitor.

As described above, although the preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:

1. A solid electrolytic capacitor, comprising:
   a capacitor element with positive polarity therein, wherein an external surface of the capacitor element is surrounded with a cathode layer;
   an anode wire inserted into one end of the capacitor element;
   a cathode terminal electrically connected to the capacitor element by being positioned at one side of a lower part of the capacitor element;
   an anode terminal which defines a molding injection space on a top surface thereof and is electrically connected to the anode wire by being positioned at the other side of the lower part of the capacitor element;

a conductive paste coated on the capacitor element and being thicker toward an inside of the capacitor element, thereby electrically connecting the capacitor element to the cathode terminal, and broadening a space between the capacitor element and the anode terminal;

a molding unit which wraps an external surface of the cathode layer and is formed to expose bottom surfaces of the anode terminal and the cathode terminal; and a fixing film made of conductive epoxy which is closely coupled to a bottom surface of the conductive paste, wherein the molding unit is formed to wrap the capacitor element and the fixing film in a state of closely adhering the conductive paste and the cathode terminal to top and bottom surfaces of the fixing film, respectively.

2. The solid electrolytic capacitor of claim 1, wherein the conductive paste is made of any one selected from the group consisting Ag, Au, Pd, Ag, Ni and Cu.

3. The solid electrolytic capacitor of claim 1, wherein the anode wire is electrically bonded to reinforcing material vertically coupled with the anode terminal.

4. The solid electrolytic capacitor of claim 3, wherein the anode wire and the reinforcing material are bonded through laser welding.

5. The solid electrolytic capacitor of claim 1, wherein the capacitor element and the anode terminal are insulated through a portion of the molding unit defined by molding material injected into the molding injection space.

6. The solid electrolytic capacitor of claim 5, wherein the molding injection space is formed by a step portion formed on the top surface of the anode terminal and the step portion is formed through etching or pressing.

7. The solid electrolytic capacitor of claim 1, wherein the fixing film is formed in the substantially same area as the conductive paste.

8. A solid electrolytic capacitor, comprising:

a capacitor element with positive polarity therein, wherein an external surface of the capacitor element is surrounded with a cathode layer;

an anode wire inserted into one end of the capacitor element;

an anode terminal electrically connected to the anode wire through reinforcing material by being positioned at one side of a lower part of the capacitor element;

a cathode terminal positioned at the other side of the lower part of the capacitor element and electrically connected to the capacitor element through conductive paste, the conductive paste being coated thicker as the conductive paste approaches an inside of the capacitor element, thereby broadening a space between the capacitor element and the anode terminal;

a molding unit which wraps an external surface of the cathode layer and is formed to expose bottom surfaces of the anode terminal and the cathode terminal; and a fixing film closely coupled to a bottom surface of the conductive paste, wherein the molding unit is formed to wrap the capacitor element and the fixing film in a state of closely adhering the conductive paste and the cathode terminal to top and bottom surfaces of the fixing film, respectively.

9. The solid electrolytic capacitor of claim 8, wherein the capacitor element is insulated from the anode terminal through a portion of the molding unit defined by molding material injected into a molding injection space formed at a coupling end side of the anode wire.

10. The solid electrolytic capacitor of claim 8, wherein the conductive paste is made of any one selected from the group consisting of Ag, Au, Pd, Ag, Ni and Cu.

11. The solid electrolytic capacitor of claim 8, wherein the fixing film is made of steel.

12. The solid electrolytic capacitor of claim 8, wherein the fixing film is made of paste material.

13. The solid electrolytic capacitor of claim 8, wherein the fixing film is made of conductive epoxy.

* * * * *